(12) United States Patent
Smith

(10) Patent No.: US 12,187,091 B1
(45) Date of Patent: Jan. 7, 2025

(54) UPPER CONTROL ARM SYSTEM

(71) Applicant: Shock Therapy Suspension, Inc., Duluth, GA (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 18/531,915

(22) Filed: Dec. 7, 2023

(51) Int. Cl.
*B60G 3/18* (2006.01)
*B60G 3/20* (2006.01)
*B60G 3/26* (2006.01)

(52) U.S. Cl.
CPC .......... *B60G 3/26* (2013.01); *B60G 3/18* (2013.01); *B60G 3/20* (2013.01); *B60G 2200/10* (2013.01); *B60G 2200/14* (2013.01); *B60G 2200/144* (2013.01); *B60G 2200/18* (2013.01); *B60G 2200/30* (2013.01); *B60G 2200/32* (2013.01); *B60G 2200/46* (2013.01); *B60G 2204/14* (2013.01); *B60G 2204/143* (2013.01); *B60G 2204/422* (2013.01); *B60G 2204/43* (2013.01); *B60G 2204/4302* (2013.01)

(58) Field of Classification Search
CPC ... B60G 3/18; B60G 3/20; B60G 3/26; B60G 2200/10; B60G 2200/14; B60G 2200/144; B60G 2200/18; B60G 2200/30; B60G 2200/32; B60G 2200/46; B60G 2200/466; B60G 2204/14; B60G 2204/143; B60G 2204/422; B60G 2204/43; B60G 2204/4302
See application file for complete search history.

(56) References Cited

U.S. PATENT DOCUMENTS 3,161,419 A * 12/1964 Schaaf ............ B60G 3/26
280/5.521
4,717,171 A * 1/1988 Kami ............ B60G 7/02
280/124.148
4,753,455 A * 6/1988 Murakami ......... B60G 15/062
280/124.138

(Continued)

FOREIGN PATENT DOCUMENTS

CN 101687455 B * 4/2012 ............ B60C 11/00
CN 116968811 A * 10/2023 ............ B60G 3/20

(Continued)

*Primary Examiner* — Jason D Shanske
*Assistant Examiner* — Daniel M. Keck
(74) *Attorney, Agent, or Firm* — Schmeiser, Olsen & Watts LLP

(57) ABSTRACT

A control arm system is provided. The system includes an upper control arm, a lower control arm longer than the upper control arm, a spindle, and a bracket coupled to a frame. The upper control arm and the lower control arm are coupled between the bracket and the spindle. A pivot point of the upper control arm and the bracket is closer to the spindle than a pivot point of the lower control arm and the bracket. The control arm system is moveable between a compressed position and an extended position with a neutral position between the compressed position and the extended position. A tire coupled to the spindle is rotated into a negative camber orientation when the control arm system is in a compressed position or in an extended position. A track width is maintained in the compressed, neutral, and extended positions.

7 Claims, 6 Drawing Sheets

(56) References Cited

U.S. PATENT DOCUMENTS

| | | | | |
|---|---|---|---|---|
| 6,279,920 B1 * | 8/2001 | Choudhery | ............. | B60G 3/26 |
| | | | | 280/5.521 |
| 6,676,144 B2 * | 1/2004 | Wagner | ................... | B60G 3/20 |
| | | | | 280/124.135 |
| 6,688,620 B2 * | 2/2004 | Serra | ..................... | B62D 17/00 |
| | | | | 280/5.521 |
| 7,712,748 B2 * | 5/2010 | Deal | ....................... | B60G 3/01 |
| | | | | 280/5.521 |
| 7,793,955 B2 * | 9/2010 | Suzuki | .................. | B60G 7/008 |
| | | | | 280/124.135 |
| 8,882,116 B2 * | 11/2014 | Cuttino | ................... | B60G 3/26 |
| | | | | 280/124.135 |
| 10,286,954 B2 * | 5/2019 | Klinger | ............. | B60G 17/0152 |
| 10,414,233 B2 * | 9/2019 | Shi | ....................... | B60G 11/181 |
| 10,556,474 B2 * | 2/2020 | Andou | ................... | B60G 7/001 |
| 2009/0194965 A1 * | 8/2009 | Boston | ................... | B60G 3/20 |
| | | | | 280/124.136 |
| 2016/0075378 A1 * | 3/2016 | Drabon | ................... | B60G 3/20 |
| | | | | 280/5.521 |

FOREIGN PATENT DOCUMENTS

| | | | | | |
|---|---|---|---|---|---|
| EP | 1275534 A1 | * | 1/2003 | ............... | B60G 3/26 |
| JP | 3100636 B2 | * | 10/2000 | ........... | B60G 15/062 |
| JP | 2001055034 A | * | 2/2001 | ........... | B60G 21/007 |

\* cited by examiner

UPPER CONTROL ARM SYSTEM

BACKGROUND OF THE INVENTION

Technical Field

This invention relates generally to a control arm and more particularly to a control arm system that maintains track width and provides negative camber through travel of suspension.

State of the Art

Systems exist that include an upper control arm system with upper arms, longer travel, and improved kingpin for that allows the wheel to stay more vertically connected with the ground through the long travel of the suspension. In order to do so, these systems necessarily require the track width between the tires to be narrowed as the suspension of the vehicle is extended and compressed. This becomes problematic in instances such as turning corners wherein the narrowed track width and tires more vertically connected with the ground increases the risk of rolling the vehicle, particularly when taking the corner at speed.

Accordingly, there is a need for an improved control arm system that maintains track width and provides negative camber on the tires to be resistant to rolling the vehicle when cornering.

SUMMARY OF THE INVENTION

An embodiment includes a control arm system comprising: an upper control arm; a lower control arm longer than the upper control arm; a spindle; and a bracket coupled to a frame, wherein the upper control arm and the lower control arm are coupled between the bracket and the spindle such that a pivot point of the upper control arm and the bracket is closer to the spindle than a pivot point of the lower control arm and the bracket, and wherein the control arm system is moveable between a compressed position and an extended position with a neutral position between the compressed position and the extended position.

Another embodiment includes a method of using a control arm system comprising: coupling a control arm system to a vehicle and a tire, the control arm system comprising: an upper control arm; a lower control arm longer than the upper control arm; a spindle; and a bracket coupled to a frame, wherein the upper control arm and the lower control arm are coupled between the bracket and the spindle such that a pivot point of the upper control arm and the bracket is closer to the spindle than a pivot point of the lower control arm and the bracket; moving the control arm system into a compressed position; rotating the tire into a negative camber position in response to moving the control arm system into the compressed position; and maintaining a track width that is substantially equal to a track width when the control arm system is in a neutral position.

Another embodiment includes a method of using a control arm system comprising: coupling a control arm system to a vehicle and a tire, the control arm system comprising: an upper control arm; a lower control arm longer than the upper control arm; a spindle; and a bracket coupled to a frame, wherein the upper control arm and the lower control arm are coupled between the bracket and the spindle such that a pivot point of the upper control arm and the bracket is closer to the spindle than a pivot point of the lower control arm and the bracket; moving the control arm system into an extended position; rotating the tire into a negative camber position in response to moving the control arm system into the extended position; and maintaining a track width that is substantially equal to a track width when the control arm system is in a neutral position.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an improved control arm system that maintains track width and provides negative camber on the tires to be resistant to rolling the vehicle when cornering.

Figure 1:
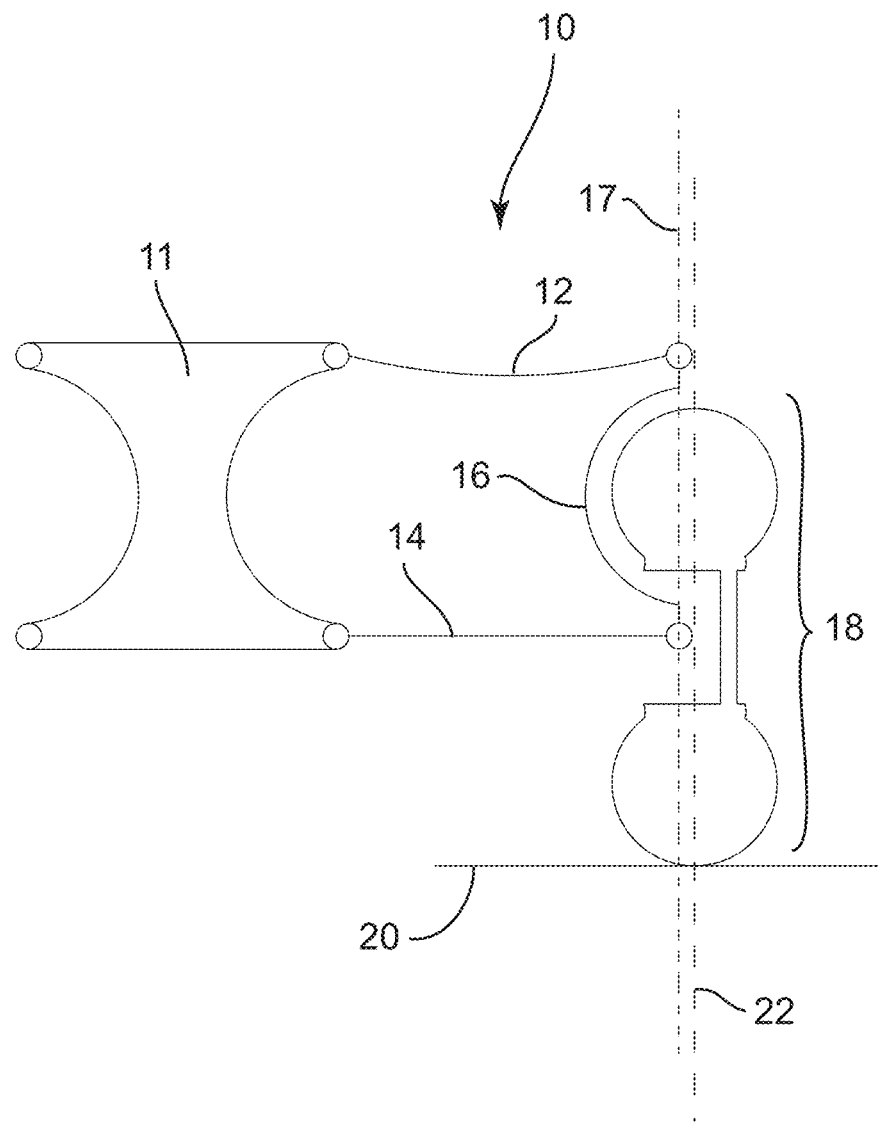
FIG. 1 is a diagrammatic view of a prior art control arm system in a neutral position according to an embodiment.
Figure 2:
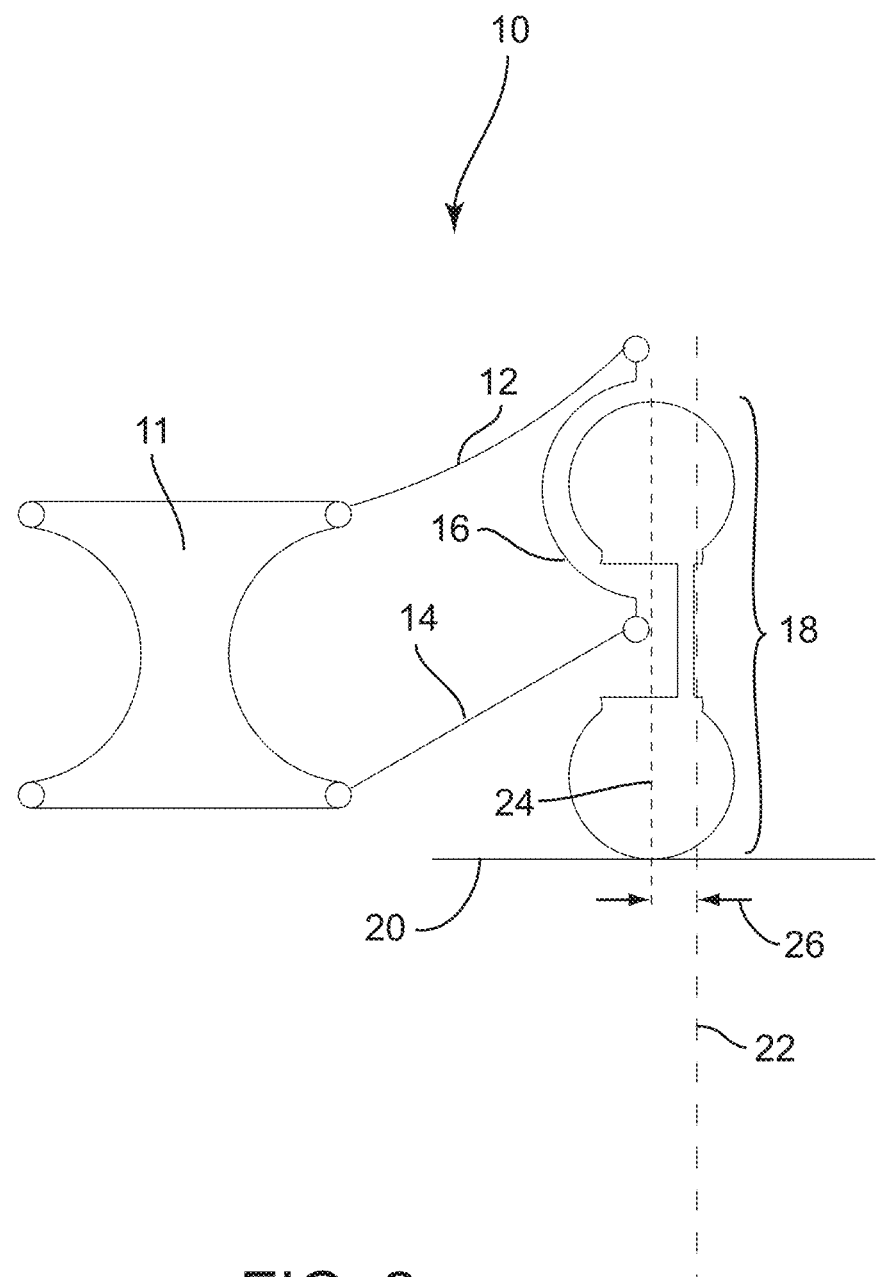
FIG. 2 is a diagrammatic view of a prior art control arm system in a compressed position according to an embodiment.
Figure 3:
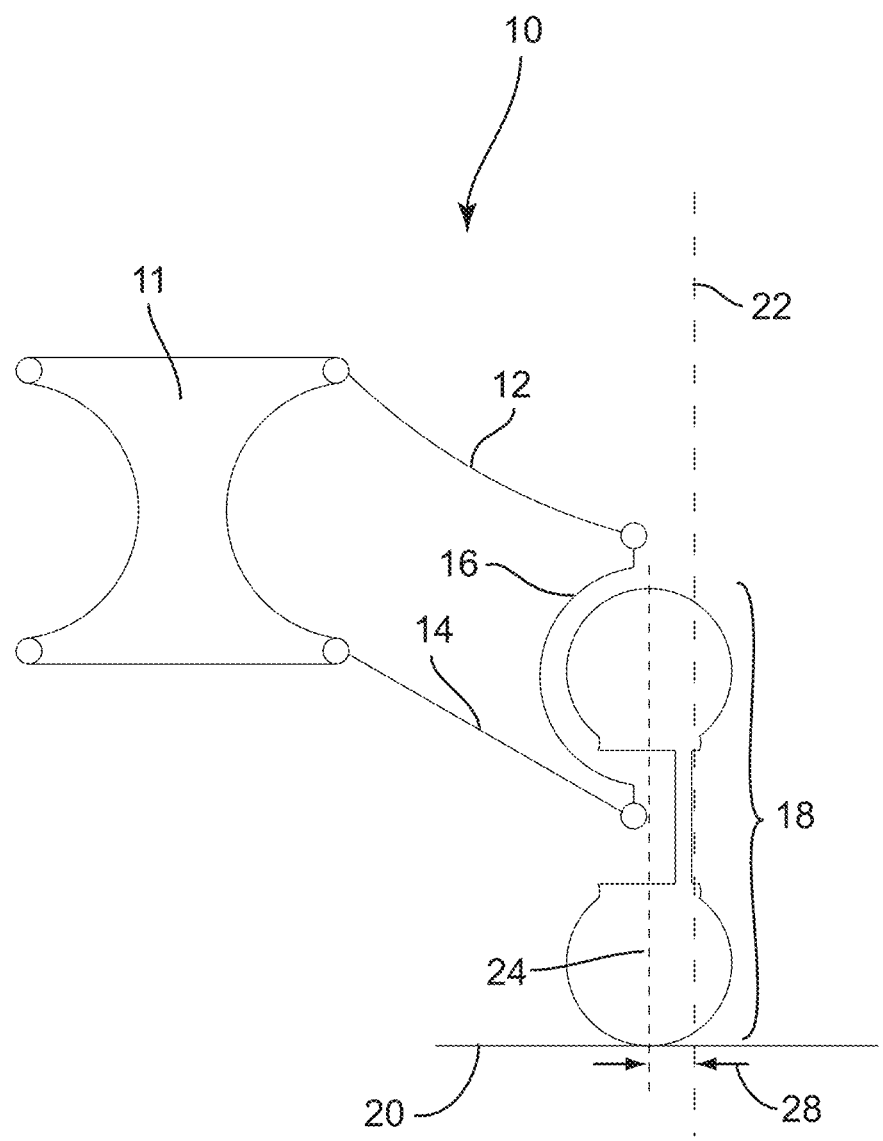
FIG. 3 is a diagrammatic view of a prior art control arm system in an extended position according to an embodiment.

A prior art control arm system 10 is depicted in FIGS. 1-3. The prior art system 10 includes an upper control arm 12, a lower control arm 14 and a spindle 16, wherein the upper control arm 12 and the lower control arm 14 are coupled between a frame 11 and the spindle 16. The tire 18 is shown in a section view and is operatively coupled to the spindle 16. In this prior art system 10, the upper control arm 12 and the lower control arm 14 are substantially equal in length and substantially parallel. The equal length and parallel configuration of the upper control arm 12 and the lower control arm 14 also have substantially aligned pivot points on the frame 11 side and on the spindle 16 side of the upper and lower control arms 12 and 14. This results in a kingpin center line 17 that is substantially vertical. This configuration of the upper control arm 12 and the lower control arm 14 (and kingpin center line 17) operate to maintain the orientation of the tire 18 substantially vertical when the suspension is being compressed, as shown in FIG. 2. Additionally, this configuration of the upper control arm 12 and the lower control arm 14 operate to maintain the orientation of the tire 18 substantially vertical when the suspension is being extended, as shown in FIG. 3.

With the suspension in a compressed position, as shown in FIG. 2, the tires 18 move their contact point with a ground surface 20 toward the vehicle from the track width line 22 that is the distance the tires 18 are from the frame when the suspension is in a neutral position (see FIG. 1). The new contact point is indicated by line 24 and depicts a narrowing of the track width by a distance 26. If suspension for all tires 18 are in a compressed position, the entire track width would be shortened by twice the distance 26. The distance 26 may be up to 6 to 8 inches.

With the suspension in an extended position, as shown in FIG. 3, the tires 18 move their contact point with the ground surface 20 toward the vehicle from the track width line 22 that is the distance the tires 18 are from the frame when the suspension is in a neutral position (see FIG. 1). The new contact point is indicated by line 24 and depicts a narrowing of the track width by a distance 28. If suspension for all tires 18 are in an extended position, the entire track width would be shortened by twice the distance 28. The distance 28 may be up to 6 to 8 inches.

As indicated above, the narrower track width becomes problematic in instances such as turning corners wherein the narrowed track width and tires more vertically connected with the ground increases the risk of rolling the vehicle, particularly when taking the corner at speed.

Figure 4:
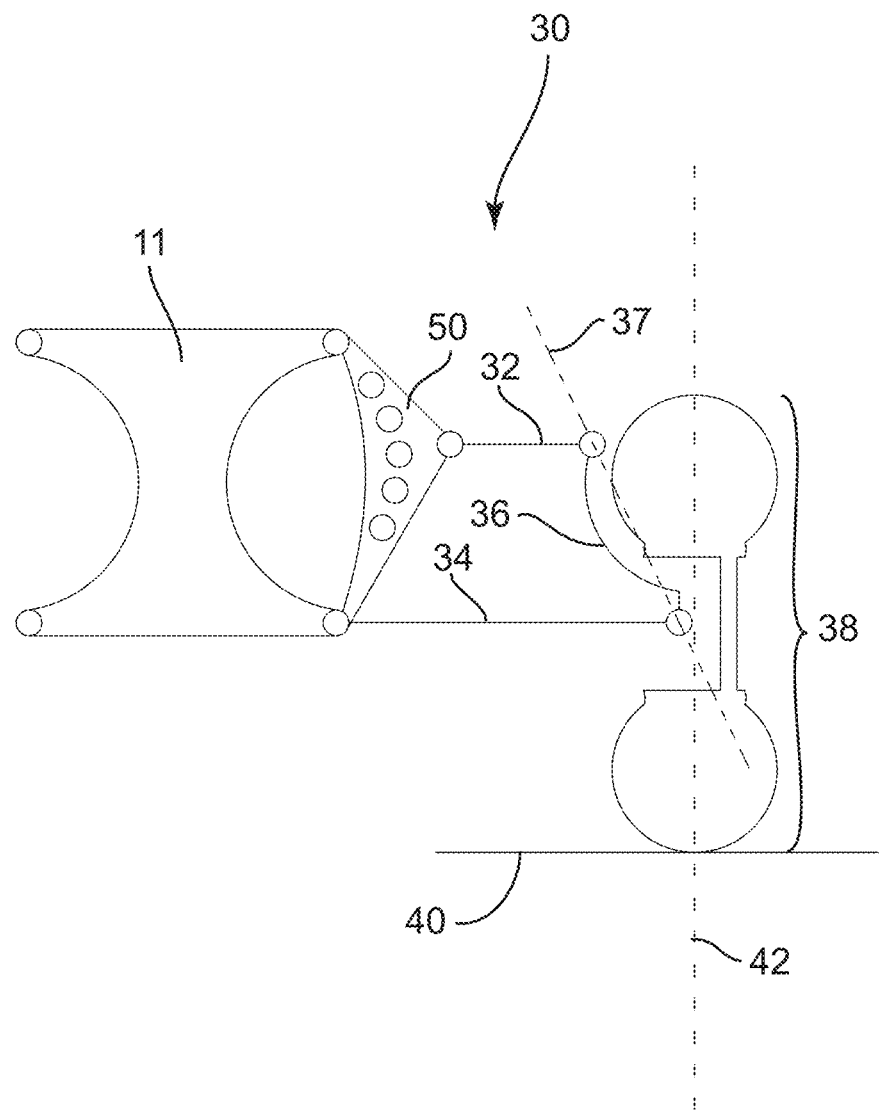
FIG. 4 is a diagrammatic view of a control arm system in a neutral position according to an embodiment.
Figure 5:
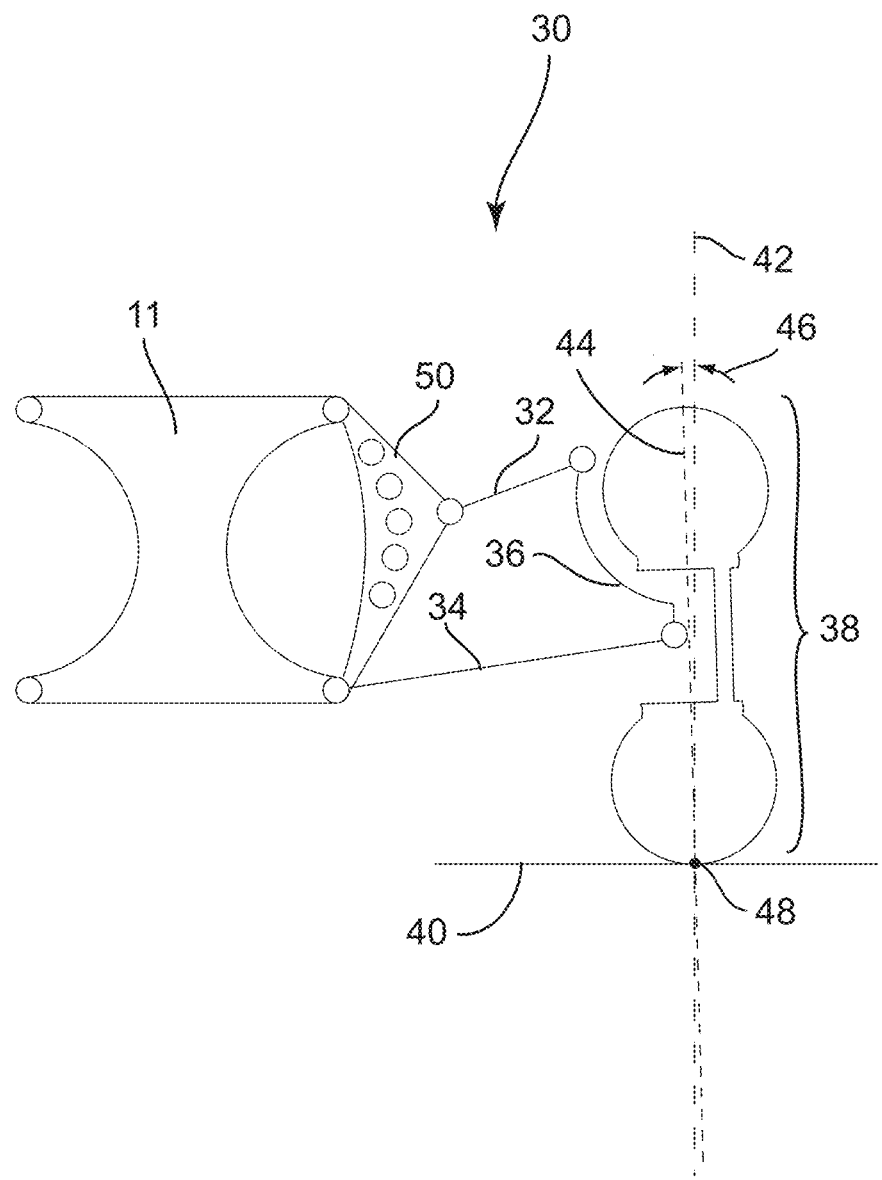
FIG. 5 is a diagrammatic view of a control arm system in a compressed position according to an embodiment.
Figure 6:
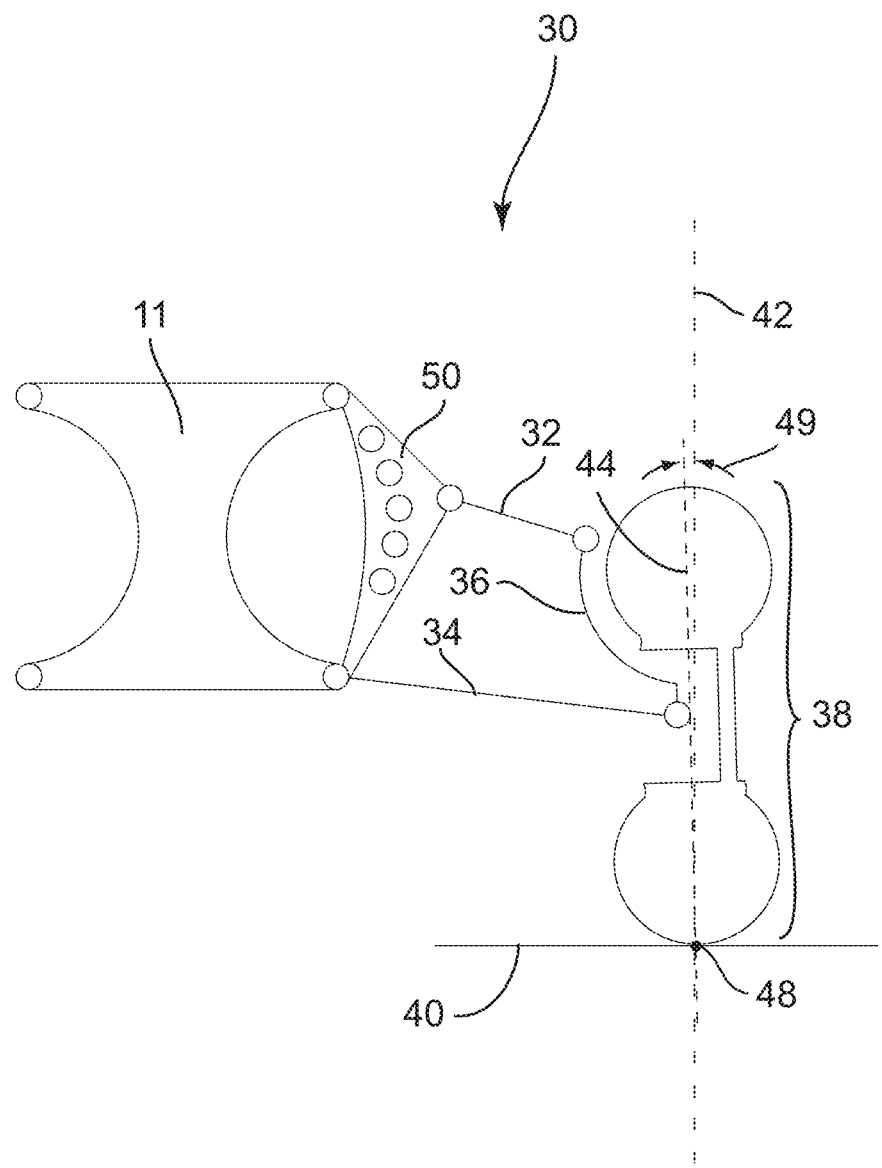
FIG. 6 is a diagrammatic view of a control arm system in an extended position according to an embodiment.

An embodiment of a control arm system 30 is depicted in FIGS. 4-6. The system 10 includes an upper control arm 32, a lower control arm 34, a spindle 36 and a bracket 50 coupled to a frame 11, wherein the upper control arm 32 and the lower control arm 34 are coupled between the bracket 50 and the spindle 36. The tire 38 is shown in a section view and is operatively coupled to the spindle 36. In this configuration, the upper control arm 32 is shorter than the lower control arm 34 and the bracket 50 configuration places a rotation point with respect to the frame 11 closer to spindle 36 that results in a rotation of the upper control arm 32 that is different from a rotation of the lower control arm 34. Further, the upper control arm 32 is moved closer to the lower control arm 36 than in the prior art embodiment shown in FIGS. 1-3, thereby creating a kingpin centerline 37 that is at an angle when compared to the kingpin centerline 17 of FIG. 1. This configuration of the upper control arm 32 and the lower control arm 34 (and angle kingpin centerline 37) operate to create negative camber orientation of the tire 38 when the suspension is being compressed, as shown in FIG. 5. Additionally, this configuration of the upper control arm 32 and the lower control arm 34 operate to create negative camber orientation of the tire 38 when the suspension is being extended, as shown in FIG. 6.

With the suspension in a compressed position, as shown in FIG. 5, the tires 38 maintain their contact point 48 with a ground surface 40 in a same place as a track width line 42 when the suspension is in a neutral position (see FIG. 4). This means that the track width 42 is maintained when the suspension is compressed. Additionally, the tires 38 are rotated in a negative camber indicated by a line 44 marking a center plane of the tire 38 with respect to the track width line 42. The negative camber is when a top of the tire 38 is moved closer to the vehicle 11 to form a negative camber angle 46 as shown in FIG. 5.

With the suspension in an extended position, as shown in FIG. 6, the tires 38 maintain their contact point 48 with a ground surface 40 in a same place as a track width line 42 when the suspension is in a neutral position (see FIG. 4). This means that the track width 42 is maintained when the suspension is compressed. Additionally, the tires 38 are rotated in a negative camber indicated by a line 44 marking a center plane of the tire 38 with respect to the track width line 42. The negative camber is when a top of the tire 38 is moved closer to the vehicle 11 to form a negative camber angle 49 as shown in FIG. 5.

Maintaining the track width 42 at a same distance and providing negative camber on the tires 38 with respect to the vehicle 11 results in improved cornering abilities without tipping of the vehicle. This allows the vehicle to operate at higher speeds without tipping or losing control than with the prior art control arm system 10.

Another embodiment includes a method of using a control arm system comprising: coupling a control arm system to a vehicle and a tire, the control arm system comprising: an upper control arm; a lower control arm longer than the upper control arm; a spindle; and a bracket coupled to a frame, wherein the upper control arm and the lower control arm are coupled between the bracket and the spindle such that a pivot point of the upper control arm and the bracket is closer to the spindle than a pivot point of the lower control arm and the bracket; moving the control arm system into a compressed position; rotating the tire into a negative camber position in response to moving the control arm system into the compressed position; and maintaining a track width that is substantially equal to a track width when the control arm system is in a neutral position.

The method may also include, in the place of the compressed position, rotating the tire into a negative camber position in response to moving the control arm system into the extended position; and maintaining a track width that is substantially equal to a track width when the control arm system is in a neutral position.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A control arm system comprising:
   an upper control arm;
   a lower control arm longer than the upper control arm;
   a spindle;
   a tire operatively coupled to the spindle;
   a bracket coupled to a frame, wherein the upper control arm and the lower control arm are coupled between the bracket and the spindle such that a pivot point of the upper control arm and the bracket is closer to the spindle than a pivot point of the lower control arm and the bracket, and wherein the control arm system is moveable between a compressed position and an extended position with a neutral position between the compressed position and the extended position; and
   a kingpin centerline that is at an angle from vertical, thereby creating a rotation of the upper control arm different from a rotation of the lower control arm when the control arm system is moved between the compressed position and the extended position.

2. The control arm system of claim 1, wherein rotation of the upper control arm and the lower control arm create negative camber orientation of the tire when in the compressed position.

3. The control arm system of claim 2, wherein a track width of the tire when in the compressed position is substantially the same as a track width of the tire when in the neutral position.

4. The control arm system of claim 1, wherein rotation of the upper control arm and the lower control arm create negative camber orientation of the tire when in the extended position.

5. The control arm system of claim 4, wherein a track width of the tire when in the extended position is substantially the same as a track width of the tire when in the neutral position.

6. A method of using a control arm system comprising:
coupling a control arm system to a vehicle and a tire, the control arm system comprising:
an upper control arm;
a lower control arm longer than the upper control arm;
a spindle, wherein the tire is operatively coupled to the spindle;
a bracket coupled to a frame, wherein the upper control arm and the lower control arm are coupled between the bracket and the spindle such that a pivot point of the upper control arm and the bracket is closer to the spindle than a pivot point of the lower control arm and the bracket; and
a kingpin centerline that is at an angle from vertical, thereby creating a rotation of the upper control arm different from a rotation of the lower control arm;
moving the control arm system into a compressed position;
rotating the tire into a negative camber position in response to moving the control arm system into the compressed position; and
maintaining a track width that is substantially equal to a track width when the control arm system is in a neutral position.

7. A method of using a control arm system comprising:
coupling a control arm system to a vehicle and a tire, the control arm system comprising:
an upper control arm;
a lower control arm longer than the upper control arm;
a spindle, wherein the tire is operatively coupled to the spindle;
a bracket coupled to a frame, wherein the upper control arm and the lower control arm are coupled between the bracket and the spindle such that a pivot point of the upper control arm and the bracket is closer to the spindle than a pivot point of the lower control arm and the bracket; and
a kingpin centerline that is at an angle from vertical, thereby creating a rotation of the upper control arm different from a rotation of the lower control arm;
moving the control arm system into an extended position;
rotating the tire into a negative camber position in response to moving the control arm system into the extended position; and
maintaining a track width that is substantially equal to a track width when the control arm system is in a neutral position.

* * * * *